Jan. 16, 1962     C. F. FISCHER ET AL     3,016,574
CASTING APPARATUS
Filed Aug. 6, 1958
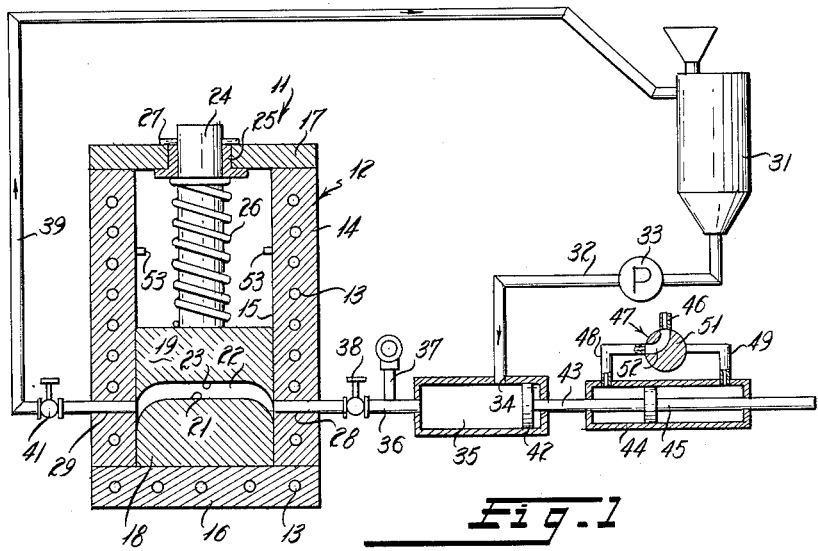
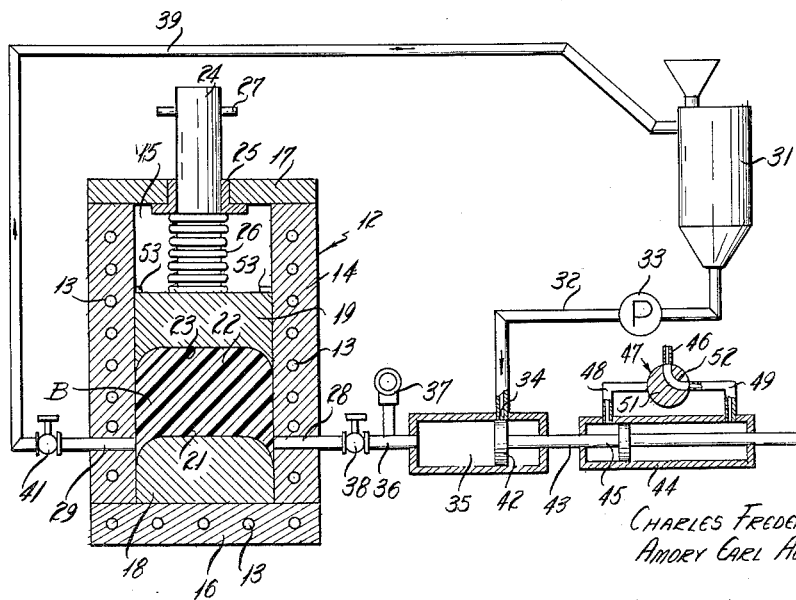
INVENTORS
CHARLES FREDERICK FISCHER
AMORY EARL AUSTIN, JR.
BY
ATTORNEYS

United States Patent Office

3,016,574
Patented Jan. 16, 1962

3,016,574
CASTING APPARATUS
Charles F. Fischer, Jersey City, and Amory E. Austin, Jr., Colonia, N.J., assignors to Colgate-Palmolive Company, New York, N.Y., a corporation of Delaware
Filed Aug. 6, 1958, Ser. No. 753,569
7 Claims. (Cl. 18—30)

This invention relates to casting apparatus and more particularly to the precision molding of products such as die members from non-ferrous plastic materials.

The invention will be described as applied to the manufacture of die members for use in soap presses. It has been found that die members made of plastic materials such as hard rubber, Bakelite and the like may be superior to hitherto used steel die members. The chief difficulty encountered in making plastic die members however is that castings made by conventional methods usually contain entrapped air bubbles and may have surface pockets due to air or gas bubbles at the forming surfaces because of molding conditions.

It is therefore the major object of the present invention to provide a novel apparatus for making die members of plastic material free of entrapped air or gas bubbles.

It is a further object of the invention to provide a novel apparatus for making bubble-free plastic die members wherein liquified plastic material is recycled through the molding cavity before molding the desired product.

Another object of this invention is to provide a novel apparatus for making bubble-free plastic die members wherein molten plastic material is initially recycled through the molding cavity, and the material in the cavity is then subjected to molding pressure and later solidified.

A further object of the invention is to provide a novel mold structure for making plastic die members wherein separable forming die members define an expansible molding cavity between them and their separation is positively controlled to provide a minimum size cavity always open to inlet and outlet passages for the material to be molded and a maximum size cavity corresponding to the size and shape of the desired product.

A further object of the invention is to provide a novel molding apparatus wherein a mold contains separable die members defining an expansible molding cavity between them and a system is provided for recirculating hot liquid plastic material through said cavity and then applying pressure to expand the mold cavity and subject the fluent material therein to molding pressure.

It is another object of the invention to provide a novel molding apparatus wherein liquified plastic is introduced into an expansible molding chamber under pump pressure and then the pressure in the cavity is increased by further means.

Further objects of the invention may appear as the description proceeds in connection with the appended claims and the annexed drawings wherein:

FIGURE 1 is a diagrammatic illustration partially sectioned showing the process and apparatus according to a preferred embodiment of the invention and particularly showing the parts as related during the initial and recycling stages;

FIGURE 2 is a similar diagrammatic view but showing the parts as related during the actual molding of the product.

In practicing the invention according to a preferred embodiment a mold assembly 11 is provided comprising a housing 12 through the walls of which run conduits 13 for temperature control. Conduits 13 may contain a heating fluid during the recycling and molding steps of the process, and may contain a cooling fluid during solidification of the product if rapid cooling is desirable. Other mold heating and/or cooling means may be used. The housing 12 comprises a hollow side wall section 14 which surrounds a chamber 15 that has a horizontal cross-section corresponding in shape to the soap press die part to be formed. Bottom wall 16 is removably secured to close the lower end of chamber 15 and a removable top wall 17 closes the upper end of chamber 15.

Chamber 15 contains a lower forming die member 18 that is fixed to bottom wall 14 and a slidably mounted upper forming die member 19.

Lower forming die member 18 is of the cross-section of chamber 15 and has an upper surface 21 having smooth arcuate sides as shown and shaped exactly according to the desired contour of the soap die to be molded. In effect surface 21 constitutes the stationary bottom face of the forming die cavity indicated at 22.

Upper forming die member 19 is also of the cross-section of chamber 15 and its bottom surface 23 is preferably shaped to the same general contour as surface 21, and surface 23 is the upper face of die cavity 22. Surface 23 is preferably shaped exactly according to the desired contour of the back of the soap die to be molded. Die member 19 is mounted on the lower end of a post 24 disposed centrally of chamber 15 and slidably extending through a bushing 25 in the top wall 17. Die member 19 cannot rotate about the axis of post 24 because of its shape in cross-section which is essentially rectangular.

A powerful coiled compression spring 26 surrounds post 24 to react between top wall 17 and die member 19 so as to urge die member 19 down toward its FIGURE 1 position. Downward movement of die member 19 is limited by a suitable stop, such as radial pins 27 engaging the top wall 17, and this is so arranged that cavity 22 remains partially open as shown in FIGURE 1 with inlet 28 and outlet 29 unblocked. This is the normal starting position of the forming die parts in the process of the invention.

A vessel 31 is provided in which a supply of the plastic material to be molded in chamber 22 is maintained at a sufficient temperature to render it fluent. A conduit 32 containing a pump 33 is connected to a side inlet opening 34 in a compression cylinder chamber 35. A conduit 36 leads from the adjacent end of chamber 35 to die cavity inlet 28, a fluid pressure gauge 37 and a manually operable shut-off valve 38 being provided in conduit 36.

A return conduit 39 having a shut-off valve 41 connects cavity outlet 29 to the upper end of vessel 31.

When valves 38 and 41 are both open, a continuous fluid circuit is provided from vessel 31, through conduit 32, chamber 35, conduit 36, inlet 28, cavity 22, outlet 29 and conduit 39 back to vessel 31.

Cylinder chamber 35 contains a piston 42 which in the extreme retracted position of FIGURE 1 is located to the right of opening 34 so as not to block the entry of hot liquified plastic into chamber 35. During application of molding pressure piston 42 closes opening 34 as shown in FIGURE 2.

Piston 42 is mounted on a rod 43 that extends slidably through the end wall of chamber 35 into a pneumatic cylinder 44 containing a slidable actuator piston 45 fixed to rod 43. A conduit 46 from a source of compressed air is connected to a two way valve 47 and conduits 48 and 49 lead from the valve into cylinder 44 at opposite sides of piston 45. Valve 47 has a rotatable plug 51 formed with a port 52 adapted to connect either conduit 48 or 49 with the air pressure source.

In operation the parts are initially as shown in FIGURE 1. The plastic material within vessel 31 is raised to the temperature at which it is liquified and ready to flow. The forming die members are now disposed as close as possible with cavity 22 of minimum size but sufficiently open to provide continuity between inlet 28 and outlet 29. Upper die member 19 is essentially a floating die member as will appear. There is at least enough plastic in vessel 31 to fill the maximum cavity space of FIGURE 2 and the passages leading up to it.

Now with valves 38 and 41 open pump 33 is started and hot liquid plastic is cycled repeatedly through the closed circuit of vessel 31, conduit 32, chamber 35, conduit 36, cavity 22 and conduit 39. This recycling step is continued until all air from the mold cavity has been displaced by liquid plastic and cavity 22 contains only incompressible liquid plastic.

Now exit valve 41 is closed to prevent liquid plastic from leaving cavity 22. The liquified plastic continues to enter cavity 22 under pump pressure which reacts between surfaces 21 and 23 to displace floating upper die 19 upwardly against the force of spring 26 which is compressed. A suitable stop is provided, such as fixed pins 53 within chamber 15, to limit upward displacement of die member 19. When the parts have attained this maximum open position of the die shown in FIGURE 2 the shape and volume of cavity 22 are exactly that of the desired soap die to be molded. Instead of pins 53 stops could be provided on post 24 to engage the underside of wall 17.

With pump 33 still operating and die member 19 stopped as in FIGURE 2, valve 47 is now turned to introduce air pressure to the right side of piston 45 thereby displacing rod 43 and piston 42 to the left to close opening 34. This considerably increases the pressure on the liquid plastic in chamber 22, and gauge 37 indicates when the desired molding pressure is attained. During the process the various conduits and passages are sufficiently heated to keep the plastic liquid. The mold 12 may be heated by hot liquid circulating in conduits 13.

When the molding pressure is reached, entrance valve 38 is closed so that the hot liquified plastic is trapped under that pressure within explanded cavity 22. Spring 26 aids in maintaining the molding pressure.

Now the mold 12 is cooled, this being accelerated and uniformly accomplished by circulating cold liquid through conduits 13 where rapid cooling is desired. Afterward the mold structure is separated to remove the molded plastic body B from cavity 22, and the product is finished to final form by conventional methods.

The molded product B is a solid precision molded mass of bubble-free plastic of exactly the desired shape and size.

As a refinement the mold 12 may be vibrated during the foregoing recycling process to assist in removal of air bubbles and this may speed up the operation. The invention also contemplates controlled cooling or any controlled temperature treatment of the cast mass within the mold as may be required. The process may also be applied to the molding of white metal and similar plastic or quasi-plastic materials which may be suitably liquified and resolidified. As a further refinement a suitable vacuum may be applied to vessel 31 above the liquid level therein to assist in removal of entrapped air as the fluid plastic is poured into the vessel by conduit 39.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for molding plastic products comprising a mold assembly having relatively separable forming die members defining a mold cavity between them, means normally urging the die members toward each other to define a minimum size cavity between them, means including supply and return passages for recycling liquid plastic through said cavity, means for blocking said return passage for enabling said liquid plastic to fill said cavity under pressure and force said die members apart until an enlarged cavity of predetermined size is attained, and further means effective at said supply passage for exerting increased pressure on said plastic in said enlarged cavity, said liquid plastic being recycled under pump pressure in one of said passages and said increased pressure being separately provided by a compression cylinder forming part of said supply passage.

2. An apparatus for molding plastic products comprising a mold assembly having relatively separable forming die members defining a mold cavity between them, means normally urging said die members toward each other but holding said die members spaced apart by a minimum distance to define a minimum size cavity between them, means forming an inlet and an outlet for said cavity and being arranged such that said inlet and outlet are in fluid communication through said minimum cavity irrespective of the positions of said dies, means including supply and return passages respectively connected into said inlet and said outlet for recycling liquid plastic through said minimum cavity, means for blocking said return passage for enabling said liquid plastic to fill said cavity under pressure and force said die members apart until a cavity of predetermined size is attained, and further means effective at said supply passage for exerting increased pressure on said plastic in said enlarged cavity.

3. An apparatus for molding plastic products comprising a mold assembly having a stationary forming die and a movable forming die defining a molding cavity between them, means defining inlet and outlet ports for said cavity and arranged closely adjacent to said fixed die, means arresting movement of said movable die toward said stationary die so that said dies are always partially spaced apart to form a minimum cavity in fluid communication with said inlet and outlet ports at all times, means providing inlet and outlet passages respectively connected to said inlet and outlet ports, means for introducing liquid plastic into said minimum cavity through said inlet port and for recirculating through said inlet and outlet passages until air is displaced from said minimum cavity and replaced by liquid plastic, means for placing liquid plastic in said cavity under pressure sufficient to shift said movable die away from said stationary die, and means arresting movement of said movable die after a predetermined travel for defining an enlarged cavity of the shape and size of the desired product.

4. In the apparatus defined in claim 2, said movable die being resiliently urged toward said stationary die.

5. In the apparatus defined in claim 2, means for arresting said recirculation and increasing the pressure on the plastic liquid in said cavity to full molding pressure.

6. In the apparatus defined in claim 5, a pressure indicating gauge in said inlet passage for indicating said molding pressure.

7. In the apparatus defined in claim 1, a piston in said compression cylinder, and a reversible motor for actuating said piston.

References Cited in the file of this patent
UNITED STATES PATENTS

| | | |
|---|---|---|
| 2,781,547 | Moxness | Feb. 19, 1957 |
| 2,803,043 | Stephens | Aug. 20, 1957 |